(12) United States Patent
Sadeck et al.

(10) Patent No.: US 8,353,480 B2
(45) Date of Patent: Jan. 15, 2013

(54) CONCENTRIC PERIPHERAL CANOPY PARACHUTE

(75) Inventors: James E. Sadeck, East Freetown, MA (US); Justin Riley, Grafton, MA (US); Kenneth J. Desabrais, Brimfield, MA (US); Calvin Lee, Needham, MA (US)

(73) Assignee: The United States Government as Represented by the Secretary of the Army, Washington, DC (US)

( * ) Notice: Subject to any disclaimer, the term of this patent is extended or adjusted under 35 U.S.C. 154(b) by 210 days.

(21) Appl. No.: 12/791,142

(22) Filed: Jun. 1, 2010

(65) Prior Publication Data

US 2011/0290944 A1 Dec. 1, 2011

(51) Int. Cl.
*B64D 17/02* (2006.01)

(52) U.S. Cl. ....................................................... 244/145

(58) Field of Classification Search .................. 244/142, 244/145, 152, 138 R, 902
See application file for complete search history.

(56) References Cited

U.S. PATENT DOCUMENTS

| 1,802,325 | A | * | 4/1931 | Broadwick | 244/142 |
|---|---|---|---|---|---|
| 2,973,928 | A | * | 3/1961 | Turolla | 244/152 |
| 3,385,539 | A | * | 5/1968 | Ewing et al. | 244/142 |
| 3,655,151 | A | * | 4/1972 | Ferguson | 244/142 |
| 4,623,109 | A | * | 11/1986 | Sadeck | 244/152 |
| 4,955,563 | A | | 9/1990 | Lee et al. | |
| 5,388,787 | A | * | 2/1995 | Webb et al. | 244/145 |
| 6,644,597 | B1 | | 11/2003 | Bahniuk | |
| 6,669,146 | B2 | | 12/2003 | Lee et al. | |
| 7,461,817 | B1 | | 12/2008 | Hansson et al. | |
| 2008/0302917 | A1 | | 12/2008 | Sadeck | |

\* cited by examiner

*Primary Examiner* — Tien Dinh
*Assistant Examiner* — Valentina Xavier
(74) *Attorney, Agent, or Firm* — Roger C. Phillips

(57) ABSTRACT

A concentric peripheral canopy parachute having a canopy system including a number of peripheral, stacked, concentric, canopies, each superior canopy centered and spaced above the inferior canopy and having its skirt connected to the vent of the inferior canopy for generating an increased low pressure disturbance behind the canopy system for producing higher fluid drag.

17 Claims, 8 Drawing Sheets

CONCENTRIC PERIPHERAL CANOPY PARACHUTE

FIELD OF THE INVENTION

This invention relates to an improved, concentric peripheral canopy parachute.

BACKGROUND OF THE INVENTION

Peripheral canopy parachutes e.g. annular ring canopy parachutes have been used for low altitude deployment with a low rate of descent. It has been found desirable to drop military personnel and military equipment from the lowest possible altitude and at the maximum horizontal velocity in order to reduce exposure to enemy fire. The increased loads which today's troops must carry with them when they jump requires that any new parachute must provide a high drag coefficient so as to land the paratrooper at a safe velocity. These parachutes open fast and have high drag coefficients and are relatively small and lightweight. A later approach adds a cap over the annular ring canopy to seek to improve performance. Increasingly there is a demand to drop ever larger payloads for beyond mere personnel and personal equipment e.g. 40,000 lbs pay loads. Even using a number of parachutes to drop a 40,000 lb load, for example five parachutes each carry 8,000 lbs of the load, each parachute would be in the neighborhood of 120 feet in width, making for a large, heavy, expensive and unwieldy device.

SUMMARY OF THE INVENTION

It is an object of this invention to provide an improved parachute which has high drag for handling larger payloads with less drag area than conventional parachutes.

It is a further object of this invention to provide such an improved parachute which opens fast, is stable, smaller and lighter in weight than conventional parachutes with similar payload capability.

It is a further object of this invention to provide an improved parachute having a geometric configuration or shape that when placed in a fluid flow creates a large low pressure region providing high drag (a drag coefficient in excess of 1.0) and substantially reduces the size of conventional parachutes improving their drag force to width ratio.

The invention results from the realization that an improved parachute which creates a large low pressure region producing high drag and substantial reduction in the size and drag force to width ratio can be achieved with a canopy system including a number of peripheral, stacked, concentric, canopies, each superior canopy centered and spaced above the inferior canopy and having its skirt connected to the vent of the inferior canopy for generating an increased low pressure disturbance behind the canopy system for producing higher fluid drag.

The subject invention, however, in other embodiments, need not achieve all these objectives and the claims hereof should not be limited to structures or methods capable of achieving these objectives.

This invention features a concentric peripheral canopy parachute including a canopy system having a primary peripheral canopy having a vent and a skirt and at least one secondary peripheral canopy concentric with the primary peripheral canopy and having a vent and a skirt. The at least one secondary peripheral canopy skirt is spaced above and inside of the vent of the primary peripheral canopy for generating an increased low pressure disturbance behind the canopy system for producing higher fluid drag. A suspension line system is connected at one end to the canopies and at the other end is confluently connected to a load bearing device.

In preferred embodiments a second secondary peripheral canopy may have a skirt and a vent; the second secondary peripheral canopy skirt may be spaced above and inside of the vent of the at least one secondary peripheral canopy. The width of the secondary canopy at its skirt may be approximately half of that of the primary canopy at its skirt. The skirt of the one secondary canopy may be spaced above the skirt of the primary canopy by approximately 20% of the width of the primary canopy at its skirt. The skirt of the second secondary canopy may be spaced above the skirt of the one secondary canopy by approximately 20% of the width of the one secondary canopy at its skirt. The canopies may be annular. The canopies may be rectangular. The suspension line system may include a plurality of main suspension lines a center suspension line and a plurality of skirt and vent lines connected from the primary canopy to confluence at associated ones of the main suspension lines. The suspension line system may include a plurality of skirt and vent lines connected from the at least one secondary canopy to the center suspension line. The suspension line system may include a plurality of centering lines connected from the skirt of the at least one secondary canopy to the skirt of the primary canopy. The suspension line system may include a plurality of centering lines connected from the skirt of the at least one secondary canopy to the vent of the primary canopy. The suspension line system may include a plurality of centering lines connected from the skirt of the at least one secondary canopy to confluence at the center suspension line.

This invention also features a concentric annular canopy parachute including a canopy system having a primary annular canopy having a vent and a skirt and at least one secondary annular canopy concentric with the primary annular canopy and having a vent and a skirt. The at least one secondary annular canopy skirt is spaced above and inside of the vent of the primary annular canopy for generating an increased low pressure disturbance behind the canopy system for producing higher fluid drag. A suspension line system is connected at one end to the canopies and at the other end is confluently connected to a load bearing device.

In preferred embodiment a second secondary annular canopy may have a skirt and a vent and the second secondary annular canopy skirt may be spaced above and inside of the vent of the at least one secondary annular canopy. The diameter of the secondary canopy at its skirt may be approximately half of that of the primary canopy at its skirt. The skirt of the one secondary canopy may be spaced above the skirt of the primary canopy by approximately 20% of the diameter of the primary canopy at its skirt. The skirt of the second secondary canopy may be spaced above the skirt of the one secondary canopy by approximately 20% of the diameter of the one secondary canopy at its skirt. The suspension line system may include a plurality of main suspension lines a center suspension line and a plurality of skirt and vent lines connected from the primary canopy to confluence at associated ones of the main suspension lines. The suspension line system may include a plurality of skirt and vent lines connected from the at least one secondary canopy to the center suspension line.

This invention also features a concentric peripheral canopy parachute including a canopy system having a number of peripheral, stacked, concentric canopies each superior canopy centered and spaced above the inferior canopy and having its skirt connected to the vent of the inferior canopy for generating an increased low pressure disturbance behind the canopy system for producing higher fluid drag, and a suspension line system connected at one end to the canopies and at the other end confluently connected to a load bearing device.

In preferred embodiments the canopies may be annular. The canopies may be rectangular. The suspension line system may include a plurality of main suspension lines, a center suspension line, a plurality of skirt and vent lines connected from the most inferior canopy to confluence at associated ones of the main suspensions lines, and a plurality of centering lines connected from the skirt of each superior canopy to either of the skirt or vent of the next inferior canopy. The suspension line system may include a plurality of skirt and vent lines connected from each the canopy to the center suspension line.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
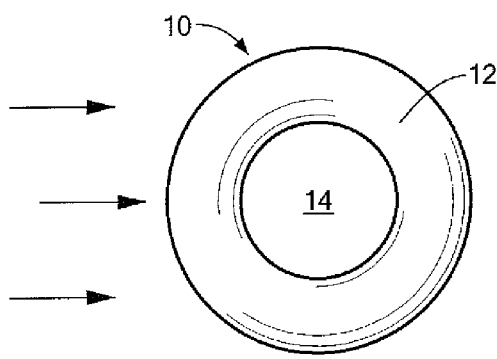
FIG. 1 is a schematic top plan view of a prior art single peripheral canopy parachute in the shape of an annular ring or semi-toroid.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
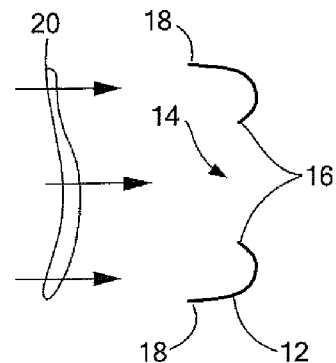
FIG. 2 is a schematic side view showing the shape of the single peripheral canopy of FIG. 1.
Figure 3:
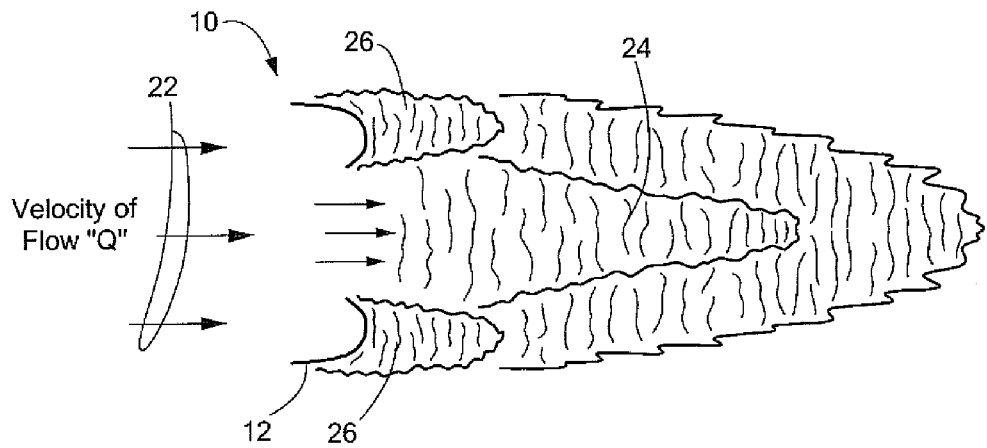
FIG. 3 is an illustrative diagram showing the low pressure field above or behind the canopy of FIGS. 1 and 2.

There is shown in FIG. 1 a plan view of a prior art peripheral canopy parachute 10 including a peripheral canopy 12, in this particular case having an annular or ring shaped periphery with a hole 14 in the middle. Canopy 12 as shown in FIG. 2, has a semi-toroidal shape with a vent 16 and skirt 18 that captures air flow 20. The pressure field created by canopy 12 is shown in FIG. 3 where the flow 20 having a velocity Q produces a large low pressure disturbance at 24 downstream or above or behind the surface cross section and an extremely low pressure zone 26 immediately behind and attached to canopy 12. These low pressure zones effectually produce a higher drag force than standard solid flat circular parachutes.

Further improvement in the drag co-efficient which increases the drag force of the system can be realized with the teachings of this invention. This invention pertains to a geometric configuration or shape that when placed in a fluid flow creates a large low pressure region producing high drag and can be used to substantially reduce the size of standard parachutes improving their drag force to diameter ratio.

Figure 4:
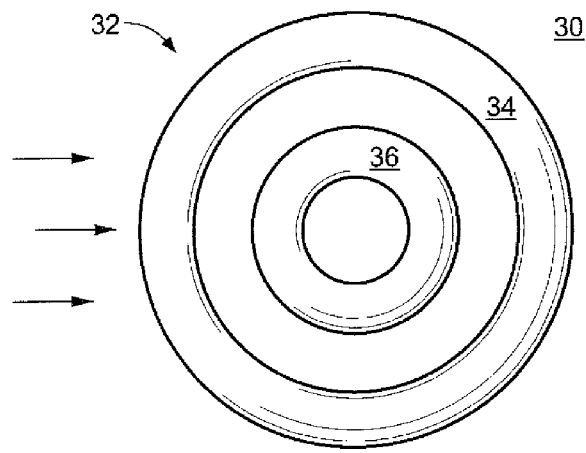
FIG. 4 is a schematic top plan view of a concentric peripheral canopy parachute with a canopy system having a plurality of peripheral canopies according to one embodiment of this invention.
Figure 5:
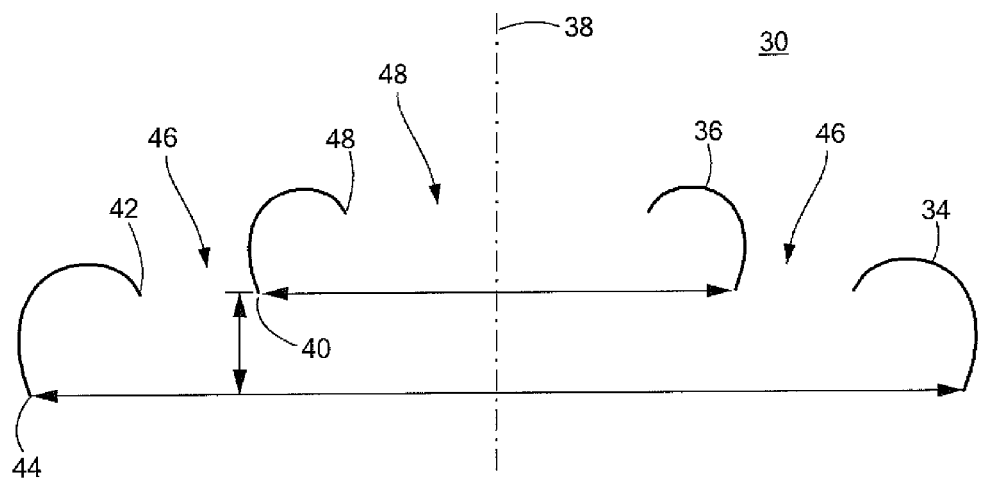
FIG. 5 is a schematic side view showing the shape and stacked, centered configuration of the peripheral canopies of FIG. 4.

One embodiment of the concentric peripheral canopy parachute 30 of this invention is shown in FIG. 4 where the peripheral shape is annular or ring like. The invention teaches a canopy system 32 of concentric stepped canopies. In FIG. 4 only two such canopies are shown 34 and 36. Peripheral canopy 34, FIG. 5, is the primary or inferior canopy and secondary or superior canopy 36 is concentric at 38 with canopy 34 and is spaced from it so that secondary canopy 36 is stacked above primary canopy 34. The skirt 40 of secondary canopy 36 is approximately even with the vent 42 of primary canopy 34. Typically the width of the secondary canopy at the skirt is approximately half that of the primary canopy at its skirt and the skirt 40 of secondary canopy 36 is spaced above the skirt 44 of primary canopy 34 by approximately 20% of the width of the primary canopy at its skirt 44. Thus, a peripheral gap 46 is created in addition to the hole 48 created within the vent 50 of secondary canopy 36. The low pressure disturbances in the downstream flow region beyond the concentric peripheral canopies 34 and 36 are substantially larger than that generated by the single peripheral prior art canopy shown in FIGS. 1-3.

Figure 6:
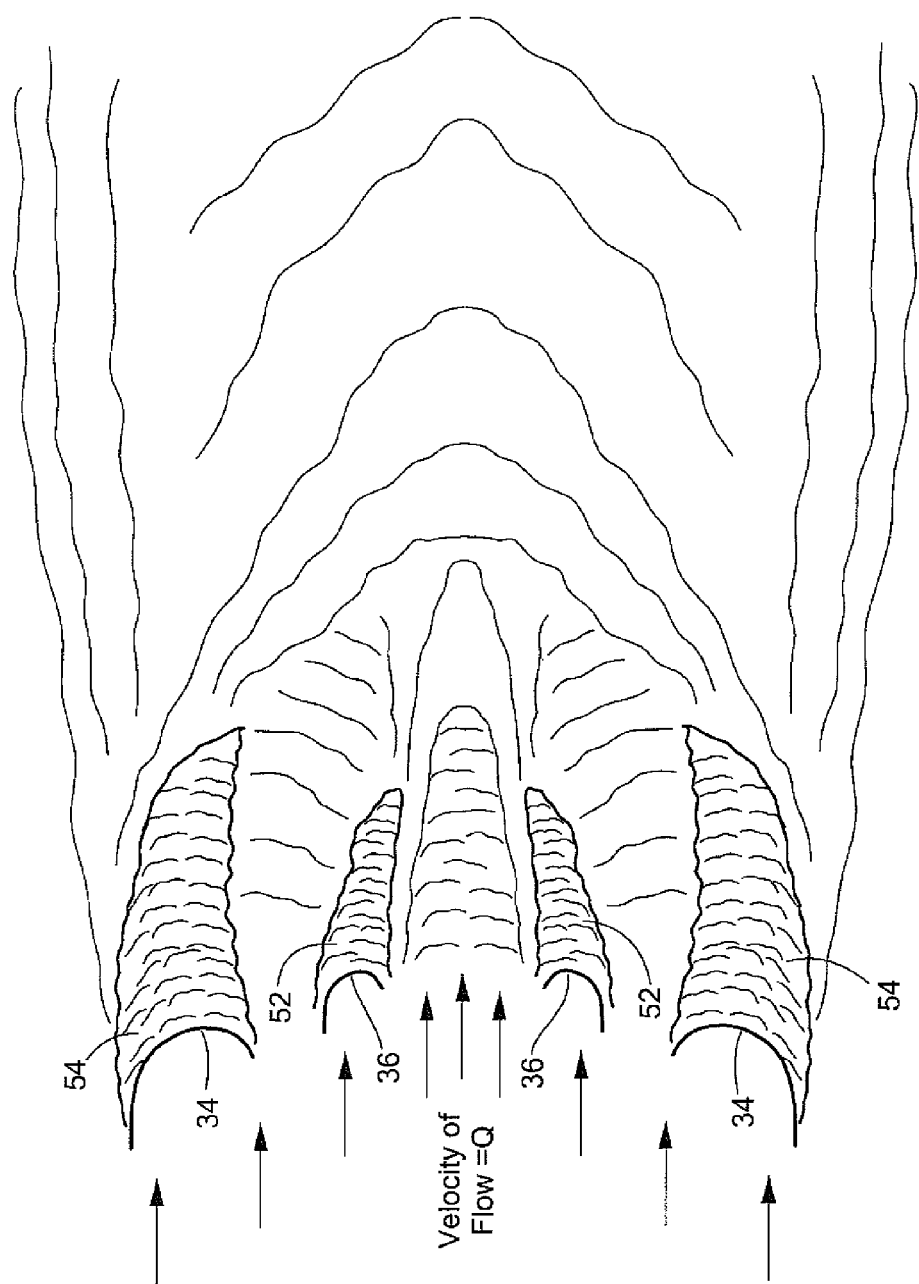
FIG. 6 is a an illustrative diagram showing the improved, low pressure field created above or behind the multiple canopy structure of FIG. 4 according to an embodiment of this invention.

The embodiments of FIGS. 4 and 5 create an extreme low pressure zone 52, FIG. 6, attached to the secondary canopy 36 and zone 54 attached to the primary canopy 34. These areas are not only lower pressure but also substantially larger. This translates to a higher fluid drag force and high drag co-efficient. The recommended relationship between canopy 34 and 36 to obtain the best drag capability as previously stated is that the width of the secondary canopy at its skirt be approximately half that of the primary canopy at its skirt and that the skirt of the secondary canopy be spaced close to the skirt of the primary canopy by approximately 20% of the width of the primary canopy at its skirt.

If the peripheral shape is annular or toroidal as shown here that width would be referred to as diameter. When used as a deceleration device such as a drogue parachute to reduce landing speeds of high performance aircraft or as a recovery parachute the device would be smaller, lighter, and have reduced pack volume when compared to standard ground parachutes.

If peripheral surface 34 has a drag area which is 25% of the drag area of peripheral surface 36 a 40% increase in drag force of the system may be realized. Additional and concentric peripheral type surfaces yield increasingly by greater drag providing larger payload capacity or reduction of overall system size for a fixed payload weight. Although FIG. 9 illustrates three concentric peripheral type surfaces and FIG. 10 four concentric peripheral type surfaces utilizing stacked, inferior and stacked superior peripheral canopies many more concentric peripheral canopies may be added as required.

Figure 7:
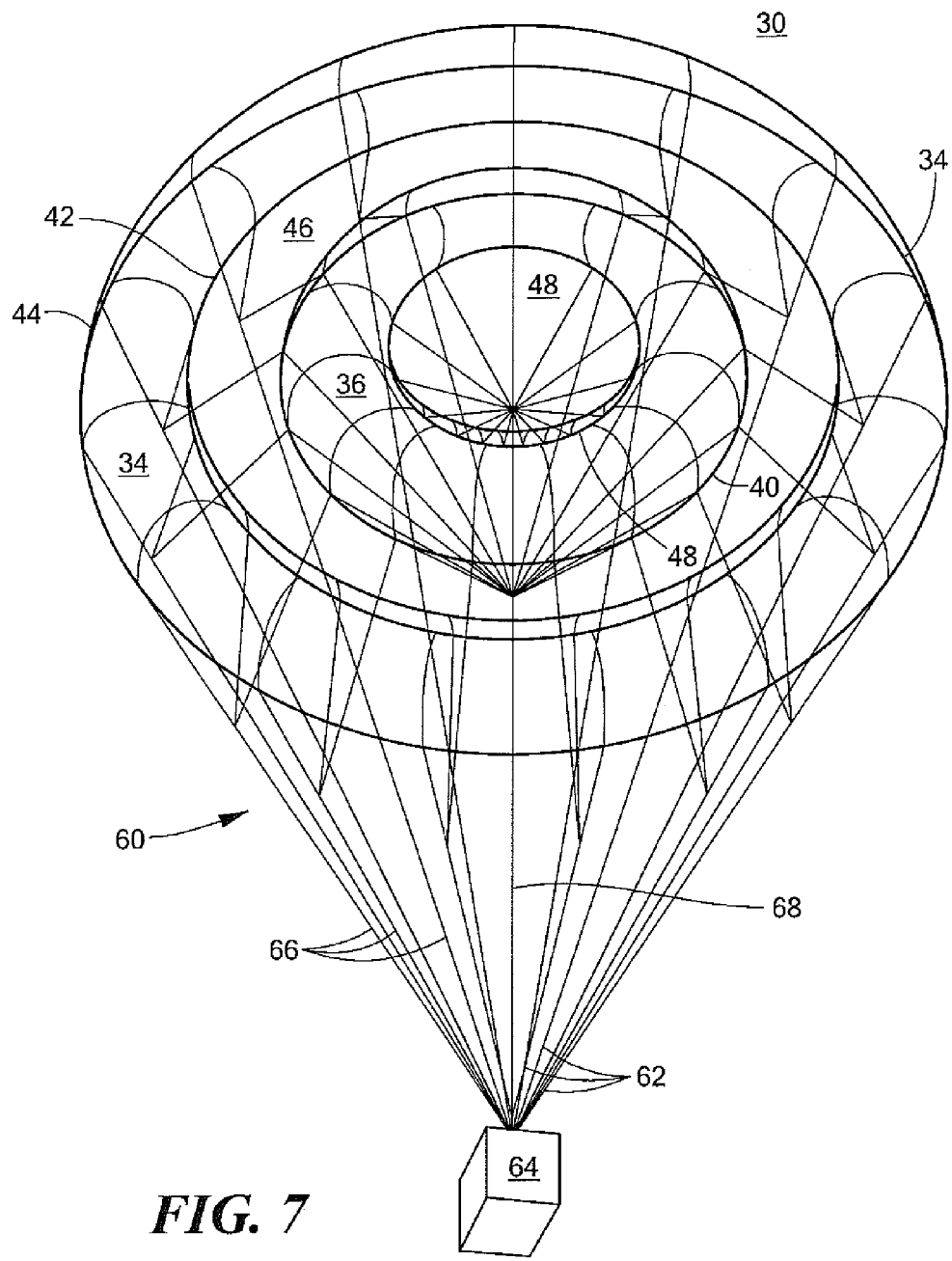
FIG. 7 is a diagrammatic, three dimensional view of the parachute of FIGS. 4 and 5 as deployed looking up into the canopies.
Figure 8:
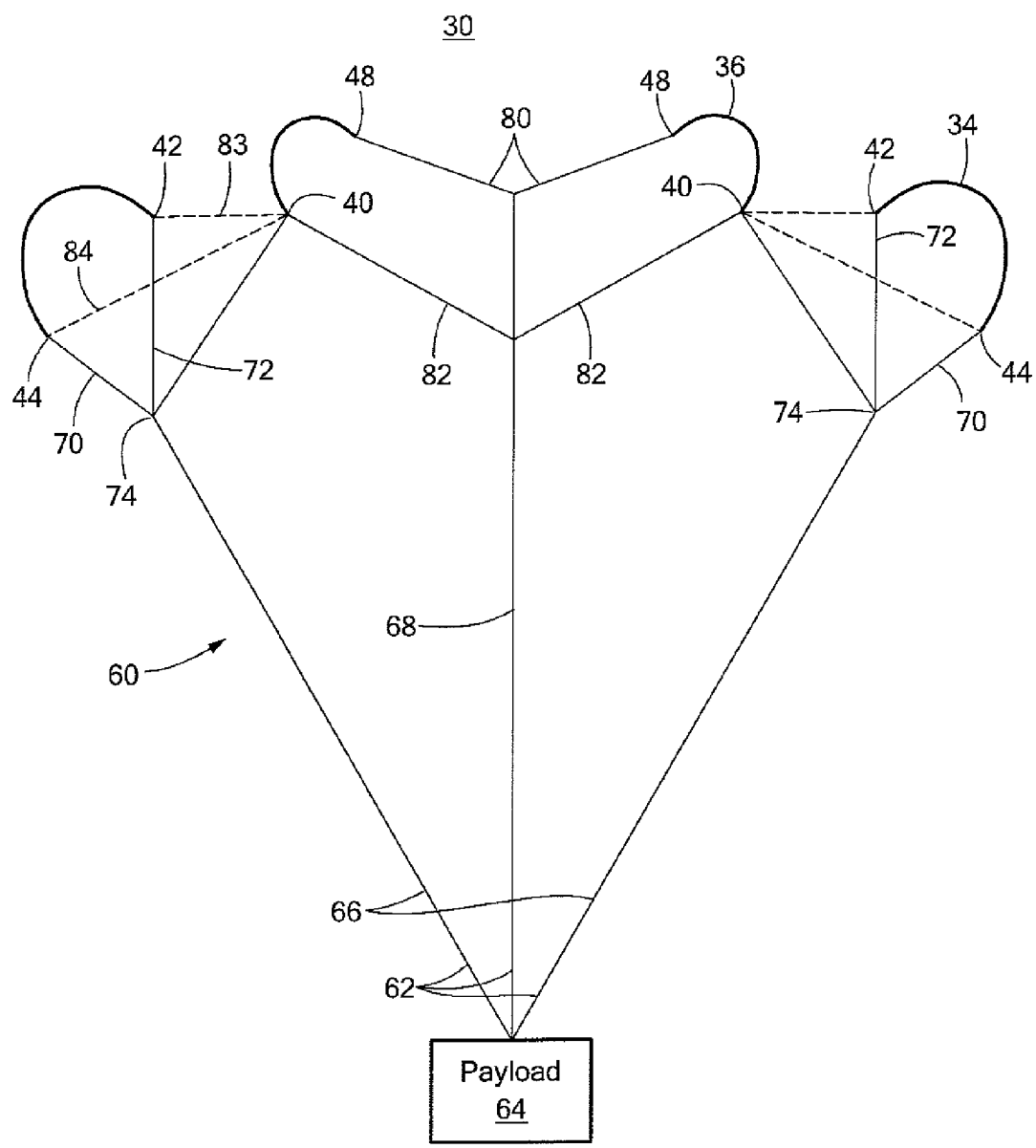
FIG. 8 is a schematic, side view showing the suspension line system for a two canopy stack as shown in FIGS. 4, 5 and 7.

Parachute 30 is shown in a deployed configuration in FIG. 7, where the peripheral or toroidal canopies 34 and 36 are inflated due to dynamic pressure produced by the parachute's descent through the atmosphere. Jointly referring to FIGS. 7 and 8, parachute 30 includes a suspension line system 60 connected at one end through risers 62 to payload 64. Suspension line system 60 may include a plurality of main suspension lines 66 which are attached to the skirt 44 of canopy of 34. Suspension line system 60 also includes a center line 68.

This invention is not limited to any particular suspension line system. For example, as shown in FIG. 9 an embodiment of this invention, parachute 30a, has skirt 44a and vent 42a of canopy 34a and skirt 40a and vent 48a of canopy 36a all connected to center line 68 via vent lines 92, 94, 96, and 98, respectively. In addition second secondary canopy 90 has vent 100 and skirt 102 connected to center line 68a via vent lines 104 and skirt lines 106.

Figure 9:
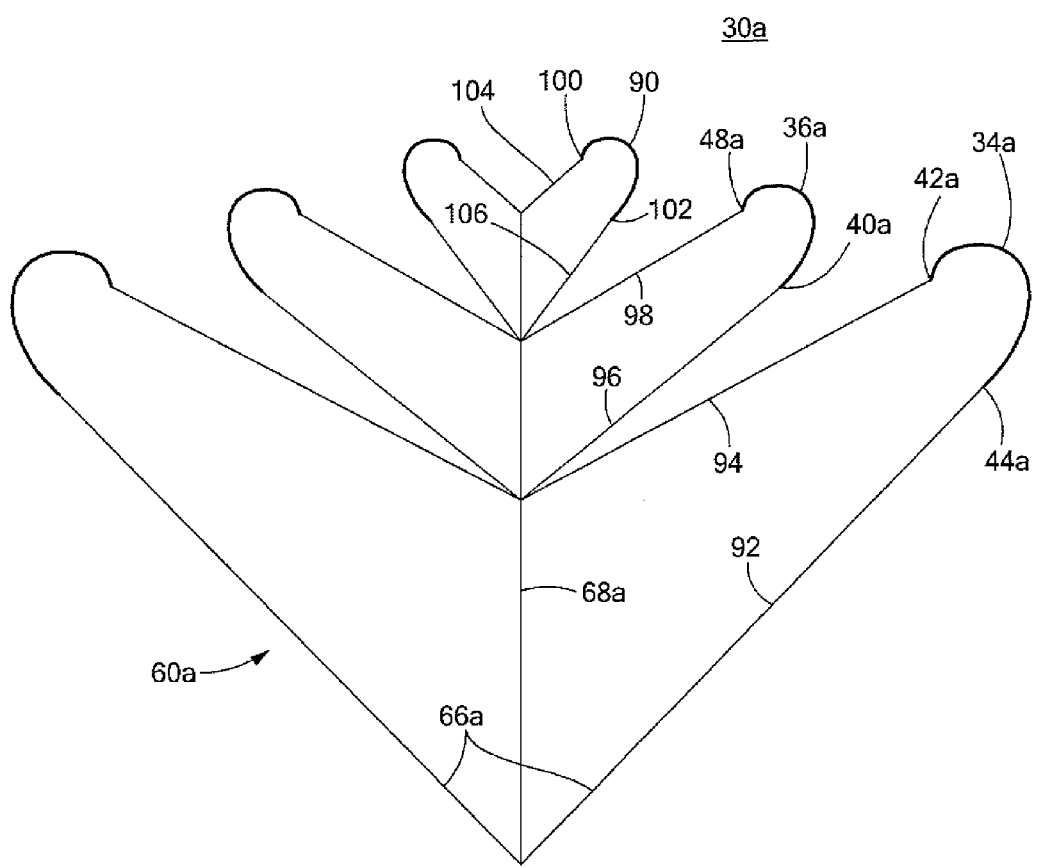
FIG. 9 is a schematic, side view showing the suspension line system for a three canopy stack according to another embodiment of the invention.
Figure 10:
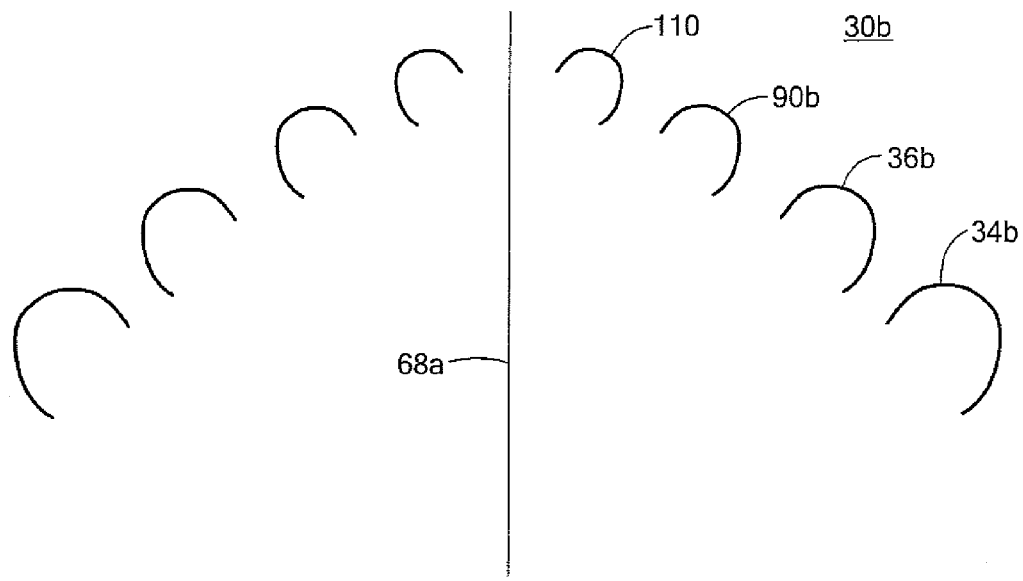
FIG. 10 is a schematic side view showing the shape, and stacked, centered configuration of a four canopy canopy system according to another embodiment of this invention.

As indicated by the presence of second secondary canopy 90 in FIG. 9, and yet a third secondary canopy 110, in FIG. 10, the invention is not limited to two or three or any particular number of canopies, but envisions a stack of one or more canopies as implemented in parachute system 30b, FIG. 10 which includes primary canopy 34b and three secondary canopies 36b, 90b, and 110. In such a stack each canopy may be referred to as an inferior canopy to the canopy above but a superior canopy to the canopy below. For example, canopy 34b, FIG. 10, is inferior to canopy 36b. Canopy 36b is superior to canopy 34b and inferior to canopy 90b. Canopy 90b is superior to canopy 36b and inferior to canopy 110. Canopy 110 is superior to canopy 90b.

Figure 11:
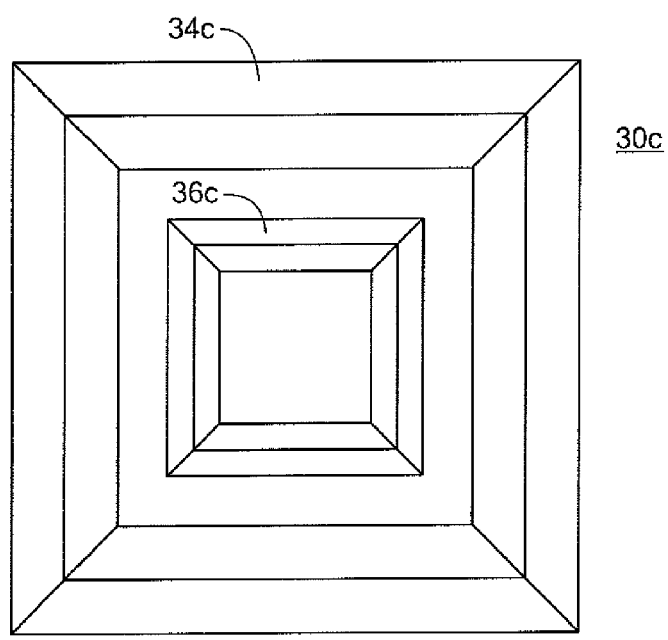
FIG. 11 is a view similar to FIG. 4 with the peripheral canopies being rectangular.
Figure 12:
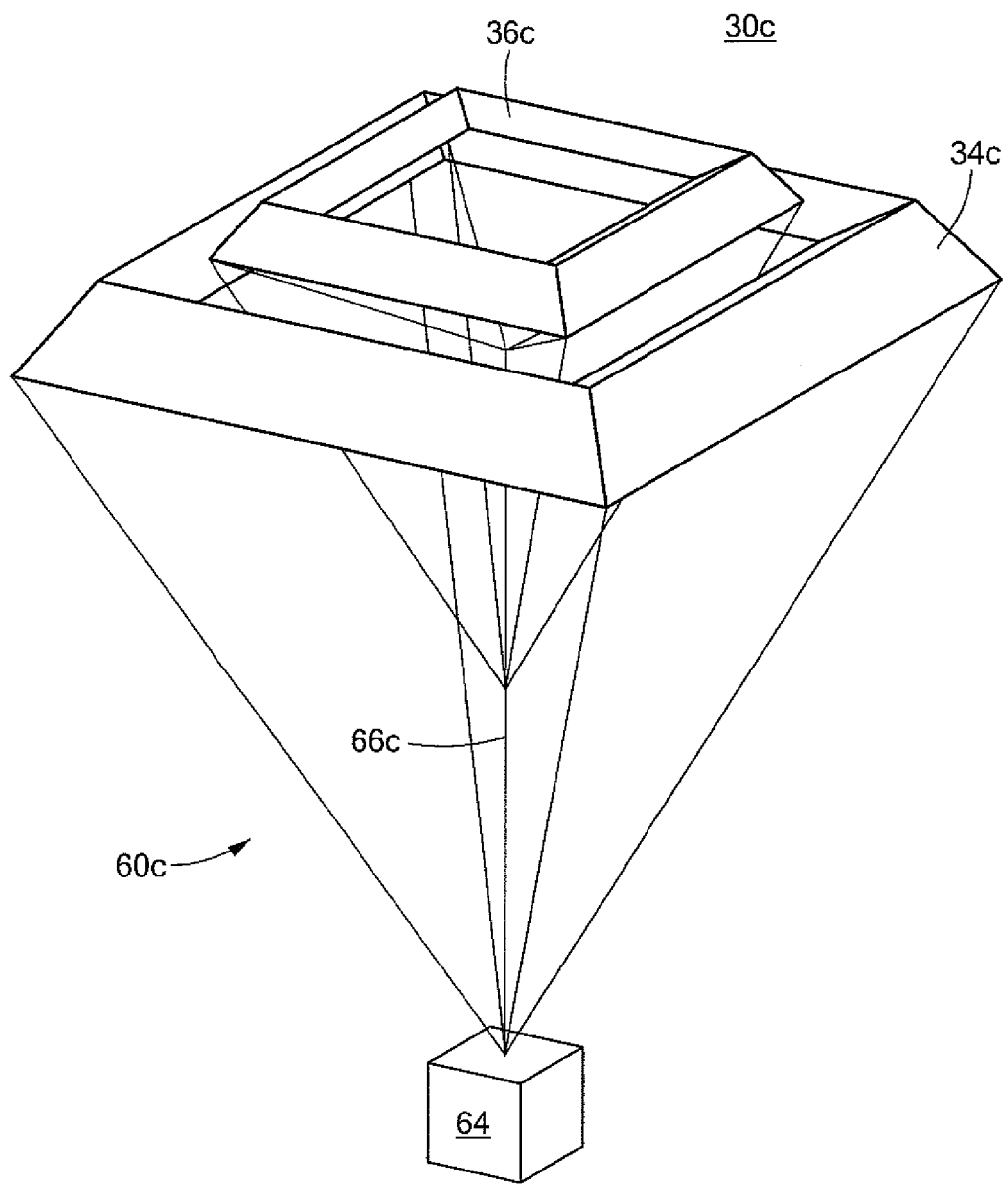
FIG. 12 is a diagrammatic three dimensional view of the parachute of FIG. 11.

Thus far the invention has been shown with the peripheral canopies having an annular or toroidal shape, but this too is not a limitation of the invention. For example, as shown in FIG. 11, the peripheral canopy may have a rectangular shape as indicated by one embodiment of a parachute 30c according to this invention. There is a primary or inferior peripheral canopy 34c and a first secondary or first superior canopy 36c which are rectangular in shape, specifically, square in FIG. 11. A better understanding of parachute 30c may be obtained in the three dimensional view of FIG. 12.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A concentric peripheral canopy parachute comprising:
    a canopy system including a primary peripheral canopy having a vent and a skirt;
    at least one secondary peripheral canopy concentric with said primary peripheral canopy and having a vent and a skirt, said at least one secondary peripheral canopy skirt being spaced above and inside of the vent of said primary peripheral canopy for generating an increased low pressure disturbance behind said canopy system for producing higher fluid drag;
    a suspension line system connected at one end to said canopies and at the other end confluently connected to a load bearing device; and
    a second secondary peripheral canopy having a skirt and a vent, the second secondary peripheral canopy skirt being spaced above and inside of the vent of said at least one secondary peripheral canopy.

2. The concentric peripheral parachute of claim 1 in which the width of said secondary canopy at its skirt is half of that of said primary canopy at its skirt.

3. The concentric peripheral parachute of claim 1 in which the skirt of said one secondary canopy is spaced above the skirt of said primary canopy by 20% of the width of the primary canopy at its skirt.

4. The concentric peripheral parachute of claim 1 in which the skirt of said second secondary canopy is spaced above the skirt of said one secondary canopy by approximately 20% of the width of the one secondary canopy at its skirt.

5. The concentric peripheral parachute of claim 1 in which said canopies are annular.

6. The concentric peripheral parachute of claim 1 in which said canopies are rectangular.

7. The concentric peripheral parachute of claim 1 in which said suspension line system includes a plurality of main suspension lines a center suspension line, and a plurality of skirt and vent lines connected from said primary canopy to confluence at associated ones of said main suspension lines.

8. The concentric peripheral parachute of claim 7 in which said suspension line system includes a plurality of skirt and vent lines connected from said at least one secondary canopy to said center suspension line.

9. The concentric peripheral parachute of claim 7 in which said suspension line system includes a plurality of centering lines connected from the skirt of said at least one secondary canopy to the skirt of said primary canopy.

10. The concentric peripheral parachute of claim 7 in which said suspension line system includes a plurality of centering lines connected from the skirt of said at least one secondary canopy to the vent of said primary canopy.

11. The concentric peripheral parachute of claim 7 in which said suspension line system includes a plurality of centering lines connected from the skirt of said at least one secondary canopy to confluence at said center suspension line.

12. A concentric annular canopy parachute comprising:
    a canopy system including a primary annular canopy having a vent and a skirt;
    at least one secondary annular canopy concentric with said primary annular canopy and having a vent arid a skirt;
    said at least one secondary annular canopy skirt being spaced above and inside of the vent of said primary annular canopy for generating an increased low pressure disturbance behind said canopy system for producing higher fluid drag;

a suspension line system connected at one end to said canopies and at the other end confluently connected to a load bearing device; and a second secondary annular canopy having a skirt and a vent, the second secondary annular canopy skirt being spaced above and inside of the vent of said at least one secondary annular canopy.

13. The concentric annular parachute of claim 12 in which the diameter of said secondary canopy at its skirt is half of that of said primary canopy at its skirt.

14. The concentric annular parachute of claim 12 in which the skirt of said one secondary canopy is spaced above the skirt of said primary canopy by 20% of the diameter of the primary canopy at its skirt.

15. The concentric annular parachute of claim 12 in which the skirt of said second secondary canopy is spaced above the skirt of said one secondary canopy by approximately 20% of the diameter of the one secondary canopy at its skirt.

16. The concentric annular parachute of claim 12 in which said suspension line system includes a plurality of main suspension lines and a center suspension line, a plurality of skirt and vent lines connected from said primary canopy to confluence at associated ones of said main suspension lines.

17. The concentric annular parachute of claim 16 in which said suspension line system includes a plurality of skirt and vent lines connected from said at least one secondary canopy to said center suspension line.

* * * * *